United States Patent [19]

Meacham

[11] 4,280,610
[45] Jul. 28, 1981

[54] ADJUSTABLE SQUEEZE POINT SAFETY DEVICE

[75] Inventor: Craig L. Meacham, Richardson, Tex.

[73] Assignee: Rockwell International Corporation, El Segundo, Calif.

[21] Appl. No.: 69,648

[22] Filed: Aug. 27, 1979

[51] Int. Cl.³ .............................................. B30B 15/22
[52] U.S. Cl. ..................................... 192/132; 100/53; 192/129 A; 192/129 B
[58] Field of Search ................... 192/132, 134, 129 B, 192/129 A, 130; 100/53

[56] References Cited

U.S. PATENT DOCUMENTS

| 1,309,246 | 7/1919 | De Smith | 192/132 |
| 2,337,143 | 12/1943 | Yanchenko | 192/134 |
| 2,375,707 | 5/1945 | Speller | 192/129 A X |
| 2,563,296 | 8/1951 | White et al. | 192/134 |
| 2,694,820 | 11/1954 | Fitzgerald et al. | 192/130 X |
| 3,273,491 | 9/1966 | Calvert | 192/132 X |
| 3,735,632 | 5/1973 | Hilton | 100/53 X |
| 3,811,667 | 5/1974 | Mayer | 100/53 X |
| 4,060,160 | 11/1977 | Lieber | 192/134 |
| 4,192,414 | 3/1980 | Baltschun | 192/134 X |

FOREIGN PATENT DOCUMENTS

1393292  5/1975  United Kingdom ............... 192/129 A

Primary Examiner—Rodney H. Bonck
Attorney, Agent, or Firm—V. Lawrence Sewell; Howard R. Greenberg; H. Fredrick Hamann

[57] ABSTRACT

An improvement is disclosed for a machine of the type having a main drive which may be activated to move a ram with a high force against a workpiece. The improvement is a safety device which includes an apparatus in addition to the main drive for moving the ram to a position near the workpiece with a low force capable of being stopped by contact with a part of the human body. Further apparatus is provided that allows the main drive to become activated only when the ram is within a preselected distance of the workpiece. As a result, the distance can be selected to be smaller than, say, a finger, so that the presence of a finger between the ram and a workpiece will prevent the ram from being driven at a high force.

1 Claim, 4 Drawing Figures

PRIOR ART

ADJUSTABLE SQUEEZE POINT SAFETY DEVICE

BACKGROUND OF THE INVENTION

This invention relates to a safety device for use with a machine of the type having a main drive which may be activated to move a ram with a high force against a workpiece.

Machines often employ high forces for the purposes of forming or cutting metal. At the same time, the metal forming parts often move at high speeds compared to human reflexes. As an operator is attempting to use such a machine quickly and efficiently, there is a considerable possibility of injuring his fingers.

Many safety devices have been developed to minimize the possibility for such injury, and they are as varied as the different types of machines to which they apply. The present device grew out of the use of and is particularly applicable to a type of machine having a movable ram which is driven suddenly and with great force against a workpiece on a fixed ram. A safety guard for such a machine, along with a general background discussion of safety devices, can be found in the U.S. Pat. No. 4,060,160 to Lieber. In that safety device, for example the approach is to establish a "gate" which might detect the finger of an operator in the work area and stop or reverse the ram upon such detection.

SUMMARY OF THE INVENTION

In accordance with the present invention there is provided an improvement for machines of the type described, including means for moving the ram of the machine to a position near the workpiece with a low force which is capable of being opposed upon contact of a part of the human body. Further included is means which allows the main drive of the machine to become activated only when the ram is within a preselected distance of the workpiece. The preselected distance can be adjusted to be somewhat less than the thickness, say, of a finger. If there is no obstruction between the ram and the workpiece, then the main drive will be activated when the ram reaches a position within the preselected distance and will be driven with a high force against the workpiece.

The safety device of the invention is completely effective. If there is an obstruction between the ram and the workpiece, the main drive of the machine is not activated and there is no danger of injury. If there is no obstruction, then the machine quickly completes its operation. Unlike the device of Lieber above, it is not a gate which detects the presence of an obstruction in the ram target area, but the ram itself. There is no danger of a finger being missed by the safety device but being hit by the ram. Therefore, auxiliary guides on the other side of the ram from the gate are not required, and in fact the workpiece may be held with fingers in relatively close proximity to the ram target area. In general then, the present safety device permits a very open working area around the workpiece. Further adding to the efficiency of a machine equipped with the present inventions is the fact that the ram stroke precedes smoothly and quickly if all is well, and is only interrupted in the event of an obstruction.

DESCRIPTION OF PREFERRED EMBODIMENT

Figure 1:
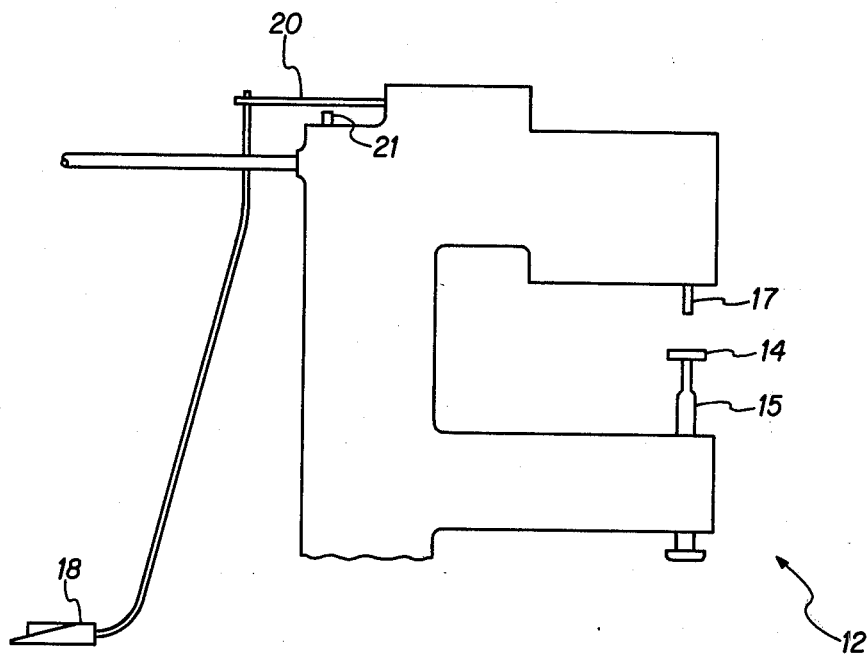
FIG. 1 is an elevation drawing showing major features of a machine of the type to which the safety device of the present invention is applicable.

FIG. 1 illustrates major features of a machine not having the improvement of the invention. Machine 12, for example, may be a compression riveter. A workpiece 14 is held on a fixed ram 15 in position to be impacted by movable ram 17. Pressing foot switch 18 pulls down a lever 20, depressing pin 21. Pin 21 operates a valve, activating movable ram 17 by the application of air pressure. Ram 17 is driven with a high force against workpiece 14. A finger caught between movable ram 17 and workpiece 14 can be severely injured.

Figure 3:
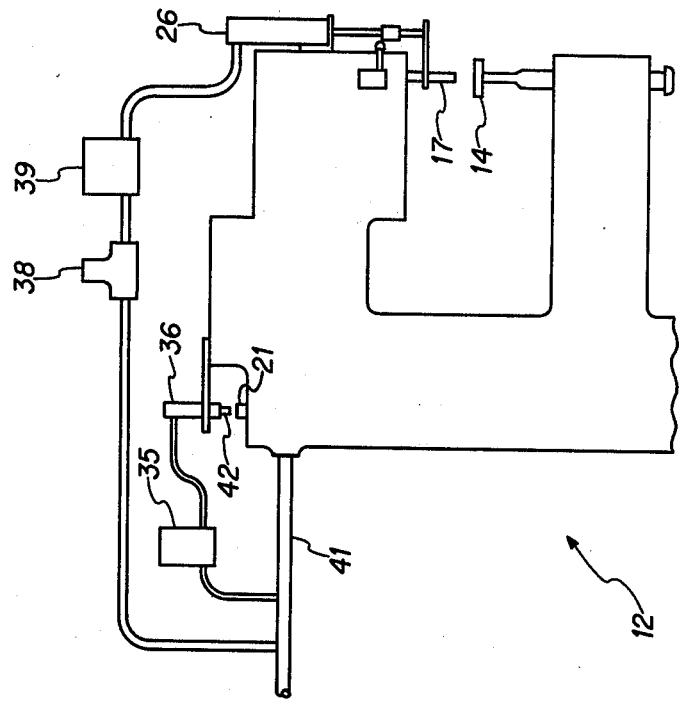
FIG. 3 shows the machine of FIG. 1 modified to include the safety device of the invention, including the features shown in detail in FIG. 2.
Figure 2:
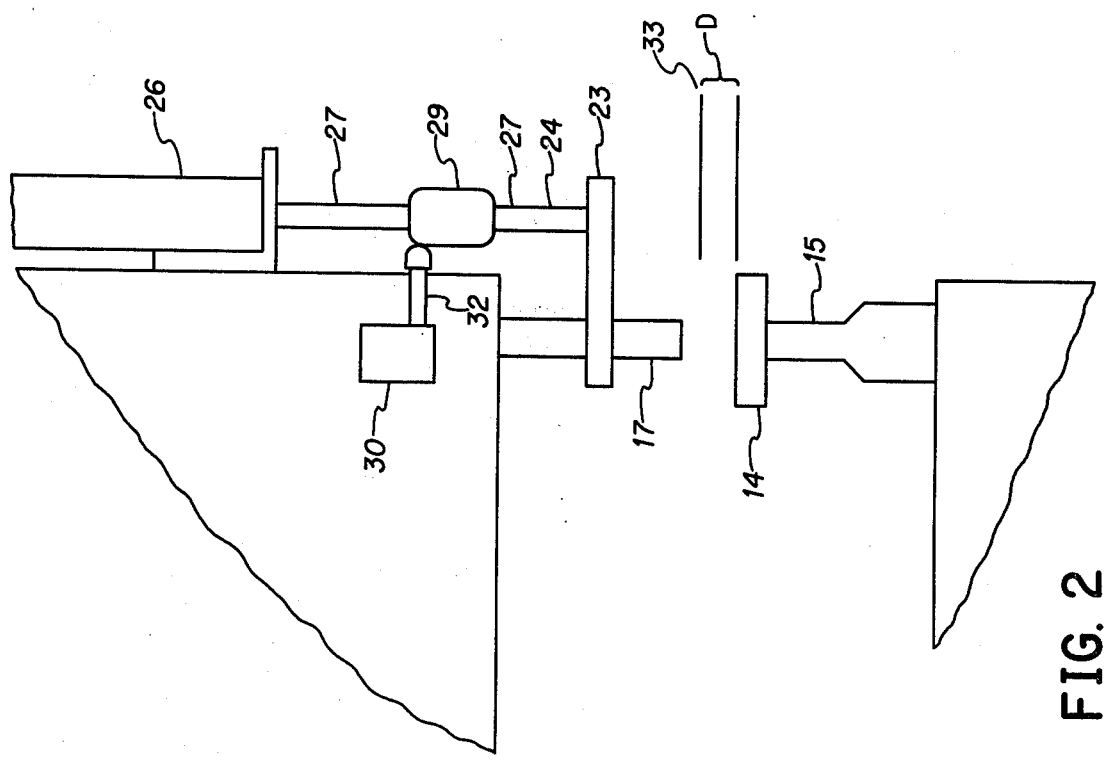
FIG. 2 shows details of a machine of the type shown in FIG. 1, equipped with the safety device of the invention.

FIGS. 2 and 3 show mechanical portions of a machine equipped with the improvement of the invention. A crosspiece 23 rigidly fastens movalbe ram 17 to a push rod 24 of a piston 26. Rod 24 has portions 27 of a first diameter and portion 29 of a larger diameter. The portion 29 can be fabricated using a collar or sleeve. Portions 27 can be one integral rod piece or two pieces fastened to either end of the collar portion 29.

A microswitch 30 has an arm 32 contacting piston rod 24. As shown, the switch 30 is a pushbutton type. Other kinds of switches can be adapted to the purposes of the invention, including those with levers and other types of actuating arms. In the specification and claims, the suitably arranged pushbotton, lever or arm will be referred to generally as an "arm".

In the position shown in FIG. 2, pushbuttom arm 32 is depressed by contact with larger diameter portion 29 of rod 24. As movable ram 17 progresses lower to position 33, spring loaded arm 32 will become in contact with upper portion 27 of rod 24. The diameters of portions 29 and 27 of rod 24 are chosen so that switch 30 is switched from open to closed, when pushbutton arm 32 moves onto upper portion 27 of the rod. Thus, when movable ram 17 is within a distance D as indicated in FIG. 2, switch 30 becomes closed. Distance D can be selected by adjusting the height of fixed ram 15 in relation to the particular workpiece 14.

FIG. 3 shows additional modifications of machine 12 which are a part of the improvement of the invention. Lever 20 (seen in FIG. 1) is replaced by firing air cylinder 36 mounted above pin 21. Firing air solenoid 35 controls the application of air pressure from air supply 41 of the machine to firing air cylinder 36. When solenoid 35 is activated, the rod 42 of cylinder 36 pushes on pin 21. This activates the main drive of machine 12 to move ram 17 against workpiece 14. An air regulator 38 and closing air solenoid 39 control the flow of air from supply 41 to closing air piston 26.

Figure 4:
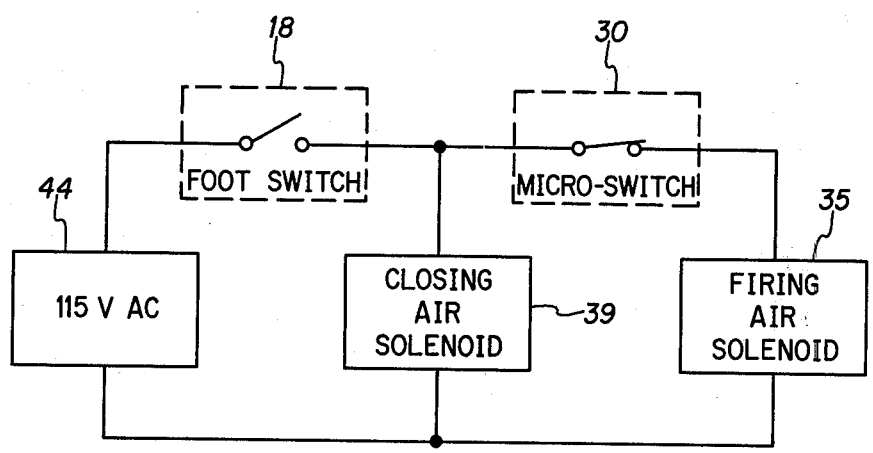
FIG. 4 is an electrical circuit diagram of connections of the safety device of the invention.

FIG. 4 shows the electrical connections of the invention. A power source 44 of 115 volts AC is connected by means of foot switch 18 to closing air solenoid 39 connected in parallel with the series combination of microswitch 30 and firing air solenoid 35. As a result, foot switch 18 must be closed to activate closing air solenoid 39, while microswitch 30 must be closed to activate firing air solenoid 35.

In operation, the operator of machine 12 presses foot switch 18 applying electrical power to closing air solenoid 39. This causes rod 24 of closing air piston 26 to begin moving movable ram 17 toward workpiece 14. Air regulator 38 must be set so that the force developed on ram 17 by rod 24 is low. Preferably, the force is low enough that if ram 17 presses against a finger or other part of the body of the operator, the ram will be stopped, without injuring the body portion. The distance (FIG. 2) is preferably set so that it is somewhat smaller than the smallest thickness of one of the operator's fingers.

If a finger is contacted by ram 17, it will stop, microswitch 30 will remain open, and firing air solenoid 35 will not be activated. In this case, movable ram 17 will not be driven against the workpiece with a high force. If no obstruction is encountered, ram 17 will decrease to the level 33 (FIG. 2), at which point pushbuttom arm 32 of microswitch 30 will move on to portion 27 of piston rod 24, closing microswitch 30. The closing of switch 30 connects electrical power to firing air solenoid 35, which activates the movement of ram 17 against the workpiece at a high force.

Thus, the operation of the present invention is efficient but safe. When foot switch 18 is pressed, ram 17 is moved relatively quickly, but gently to a position near workpiece 14. If no obstruction is encountered, the ram is driven at a high force against the workpiece. If a finger or other obstruction is in the way, the high force movement of the ram is prevented.

I claim:

1. A saftey accessory for modifying a machine of the type in which closing a main switch actuates a firing solenoid, causing a main drive to move a ram against a workpiece with a high force, the accessory comprising:
    a piston attachable to said machine and having a rod extending parallel to the direction of the motion of said ram, said rod having first and second portions of first and second thicknesses, respectively;
    a crosspiece for rigidly fastening said rod to same ram;
    means, including a closing solenoid, for activating the piston to move said crosspiece and thereby said ram to a position near the workpiece with a low force capable of being opposed by contact with a part of a human body;
    a secondary switch mountable with an actuating arm disposed so that the arm first contacts said first portion of the rod, maintaining the secondary switch open, then the arm becomes in contact with the second rod portion, closing the switch, when the ram moves within a preselected distance of the workpiece, said secondary switch being connectable in a series arrangement with said firing solenoid, and said series arrangement being connectable in a parallel configuration with said closing solenoid, and said parallel configuration being connectable in series with said main switch and a source of electrical power,
    whereby when the accessory is operative, the main switch can be closed, activating the closing solenoid to move the ram at said low force to a position near the workpiece, whereupon said secondary switch becomes closed, unless the ram is opposed by an obstruction such as a body portion thicker than said preselected distance, the closing of the secondary switch activating said firing solenoid and moving the ram at said high force against the workpiece.

* * * * *